(12) United States Patent
Gustafson et al.

(10) Patent No.: US 7,254,948 B2
(45) Date of Patent: Aug. 14, 2007

(54) BOOST WASTEGATE DEVICE FOR EGR ASSIST

(75) Inventors: Richard J. Gustafson, Columbus, IN (US); John M. Mulloy, Columbus, IN (US); Thomas McKinley, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 11/062,029

(22) Filed: Feb. 21, 2005

(65) Prior Publication Data

US 2006/0185363 A1 Aug. 24, 2006

(51) Int. Cl.
  F02B 33/44  (2006.01)
  F02M 25/07  (2006.01)
  F02M 25/06  (2006.01)
  F04D 27/02  (2006.01)
  F04D 27/00  (2006.01)
  F04D 15/00  (2006.01)

(52) U.S. Cl. .................. 60/611; 60/605.2; 123/568.12; 123/568.21; 415/1; 415/17

(58) Field of Classification Search .................. 60/611, 60/605.2; 123/568.21, 568.12, 245; 415/166, 415/1, 17; 429/13
  See application file for complete search history.

(56) References Cited

U.S. PATENT DOCUMENTS

| | | | |
|---|---|---|---|
| 3,606,209 A * | 9/1971 | Rosta et al. | ................ 244/12.2 |
| 4,227,372 A * | 10/1980 | Kakimoto et al. | ............ 60/611 |
| 4,336,688 A | 6/1982 | Dellis | |
| 4,504,190 A * | 3/1985 | Beeloo | ........................ 415/166 |
| 4,612,770 A | 9/1986 | Tadokoro et al. | |
| 4,669,442 A | 6/1987 | Nakamura et al. | |
| 5,142,866 A | 9/1992 | Yanagihara et al. | |
| 5,443,913 A | 8/1995 | Kohno et al. | |
| 5,698,780 A | 12/1997 | Mizutani et al. | |
| 5,704,340 A | 1/1998 | Togai | |
| 5,738,126 A * | 4/1998 | Fausten | ................. 123/568.21 |
| 5,755,101 A | 5/1998 | Free et al. | |
| 5,878,717 A | 3/1999 | Zur Loye | |
| 5,967,742 A * | 10/1999 | Mirsky et al. | .................. 415/1 |
| 6,012,289 A | 1/2000 | Deckard et al. | |

(Continued)

FOREIGN PATENT DOCUMENTS

CA        2406267 A1 *  4/2004

(Continued)

*Primary Examiner*—Thai-Ba Trieu
(74) *Attorney, Agent, or Firm*—Krieg DeVault LLP; J. Bruce Schelkopf, Esq.

(57) ABSTRACT

An apparatus and method for controlling exhaust gas recirculation flow. The apparatus and method uses a pressure-bleeding device, such as a wastegate valve, to change the pressure in an internal combustion engine in order to alter the flow rate of the exhaust gas through an exhaust gas recirculation conduit. In one form, the invention includes an inlet conduit connected to an intake manifold of an internal combustion engine and an exhaust conduit connected to exhaust manifold of an internal combustion engine. The pressure-bleeding device is operatively coupled to the intake conduit. Altering the pressure in the intake conduit changes the pressure across the entire system. This change in pressure in the entire system results in a change in pressure across the exhaust gas recirculation conduit. Therefore, a flow is created through the exhaust gas recirculation conduit and can be controlled using the intake side pressure bleeding device.

19 Claims, 5 Drawing Sheets

U.S. PATENT DOCUMENTS

| | | |
|---|---|---|
| 6,055,811 A | 5/2000 | Maddock et al. |
| 6,089,019 A | 7/2000 | Roby et al. |
| 6,116,026 A | 9/2000 | Freese |
| 6,289,883 B1 | 9/2001 | Wakutani et al. |
| 6,311,494 B2 | 11/2001 | McKinley et al. |
| 6,321,536 B1* | 11/2001 | Henderson et al. ........ 60/605.2 |
| 6,422,014 B1 | 7/2002 | Gladden |
| 6,422,219 B1 | 7/2002 | Savonen et al. |
| 6,435,169 B1 | 8/2002 | Vogt |
| 6,457,461 B1 | 10/2002 | Romzek |
| 6,470,864 B2* | 10/2002 | Kim et al. ............. 123/568.12 |
| 6,480,782 B2 | 11/2002 | Brackney et al. |
| 6,484,500 B1 | 11/2002 | Coleman et al. |
| 6,607,854 B1* | 8/2003 | Rehg et al. .................... 429/13 |
| 6,675,579 B1* | 1/2004 | Yang ......................... 60/605.2 |
| 6,687,601 B2 | 2/2004 | Bale et al. |
| 6,698,203 B2 | 3/2004 | Wang |
| 6,701,710 B1* | 3/2004 | Ahrens et al. ............. 60/605.2 |
| 6,813,887 B2* | 11/2004 | Sumser et al. ................. 60/611 |
| 6,898,933 B2* | 5/2005 | Klingseis ..................... 60/602 |
| 6,912,852 B2* | 7/2005 | Gottemoller et al. ......... 60/611 |
| 2003/0000507 A1* | 1/2003 | Kobayashi et al. ........ 60/605.2 |
| 2004/0006978 A1* | 1/2004 | Beck et al. .................... 60/289 |
| 2005/0022526 A1* | 2/2005 | Scheinert ..................... 60/611 |
| 2005/0188943 A1* | 9/2005 | Gonzalez et al. ............ 123/245 |

FOREIGN PATENT DOCUMENTS

| | | |
|---|---|---|
| EP | 0640174 | 9/1998 |
| JP | 61-31652 | 2/1986 |
| JP | 62-228654 | 10/1987 |
| JP | 63068722 | 3/1988 |
| JP | 8-284763 | 10/1996 |
| JP | 10-148133 | 6/1998 |
| JP | 11-315758 | 11/1999 |
| WO | WO 93/23661 | 11/1993 |

* cited by examiner

BOOST WASTEGATE DEVICE FOR EGR ASSIST

TECHNICAL FIELD

The present invention generally relates to methods to control exhaust gas recirculation, particularly, but not exclusively, to using an intake conduit side pressure altering device to control flow in an exhaust gas recirculation conduit.

BACKGROUND

Exhaust gas recirculation is a technique employed in many of the engines operated today. Exhaust gas recirculation reduces the amount of contaminants released by the exhaust gas by reducing the oxygen concentration in the intake manifold; and, thereby reducing adverse chemical reactions during combustion which produce contaminants. An exhaust gas recirculation conduit commonly has an inlet attached to the exhaust manifold of an internal combustion engine and an outlet attached to the intake manifold. Different methods are utilized to control the amount of flow through the exhaust gas recirculation line. For example, a control valve may be placed on the line to control how much flow travels through the line. In addition, a cooler is commonly used to recool the air before it is placed back in the intake manifold for combustion.

A common method for controlling the flow rate of exhaust gas through the exhaust gas recirculation line is to use an exhaust throttle to create backpressure to drive the exhaust through the exhaust gas recirculation line. One problem with this method is that an exhaust throttle is expensive. In addition, a variable geometry turbocharger may be used to drive exhaust flow through the exhaust gas recirculation line. This option is also more expensive relative to fixed geometry or wastegate turbochargers.

More cost effective solutions for EGR (exhaust gas recirculation) are desired.

SUMMARY

One aspect of the present invention is an apparatus. The apparatus includes an air intake conduit having an inlet and an outlet; a pressure bleeding device operatively coupled to the air intake conduit; an internal combustion engine including an intake manifold and an exhaust manifold, the intake manifold operatively coupled to the outlet of the air intake conduit, wherein the internal combustion engine produces exhaust gas exiting the exhaust manifold; an exhaust conduit having an inlet and an outlet, wherein the exhaust conduit inlet is operatively coupled to the exhaust manifold; and an exhaust gas recirculation conduit having an inlet and an outlet, wherein the inlet of the exhaust gas recirculation conduit is operatively coupled to the exhaust manifold and the outlet is operatively coupled to the intake manifold, wherein operation of the device alters the flow rate through the exhaust gas recirculation conduit.

Another aspect of the invention is a method for controlling exhaust gas recirculation flow. The method includes the steps of drawing air into an internal combustion engine via an intake conduit; combusting the air in the internal combustion engine; producing engine exhaust; recirculating at least a portion of the engine exhaust into the intake conduit via an exhaust gas recirculation conduit; and bleeding off at least a portion of the air drawn into the intake conduit, wherein the bleeding off alters the flow rate of the recirculated engine exhaust.

A further aspect of the invention is an apparatus. The apparatus includes an air intake conduit having an inlet and an outlet; a controllable wastegate valve operatively coupled to the air intake conduit; an internal combustion engine including an intake manifold and an exhaust manifold, the intake manifold operatively coupled to the outlet of the air intake conduit; wherein the internal combustion engine produces exhaust gas exiting the exhaust manifold; an exhaust conduit having an inlet and an outlet, wherein the exhaust conduit inlet is operatively coupled to the exhaust manifold; a turbocharger operatively coupled to the air intake conduit and the exhaust conduit; a first air cooler operatively coupled to the air intake conduit, wherein the first air cooler cools air compressed by the turbocharger; a second wastegate valve operatively coupled to the exhaust conduit, wherein the second wastegate valve enables exhaust gas to bypass the turbocharger; an exhaust gas recirculation conduit having an inlet and an outlet, wherein the inlet of the exhaust gas recirculation conduit is operatively coupled to the exhaust manifold and the outlet is operatively coupled to the intake manifold, wherein operation of the controllable wastegate valve alters the flow rate through the exhaust gas recirculation conduit; and a second air cooler operatively coupled to the exhaust gas recirculation conduit.

DETAILED DESCRIPTION OF THE SELECTED EMBODIMENTS

Figure 1:
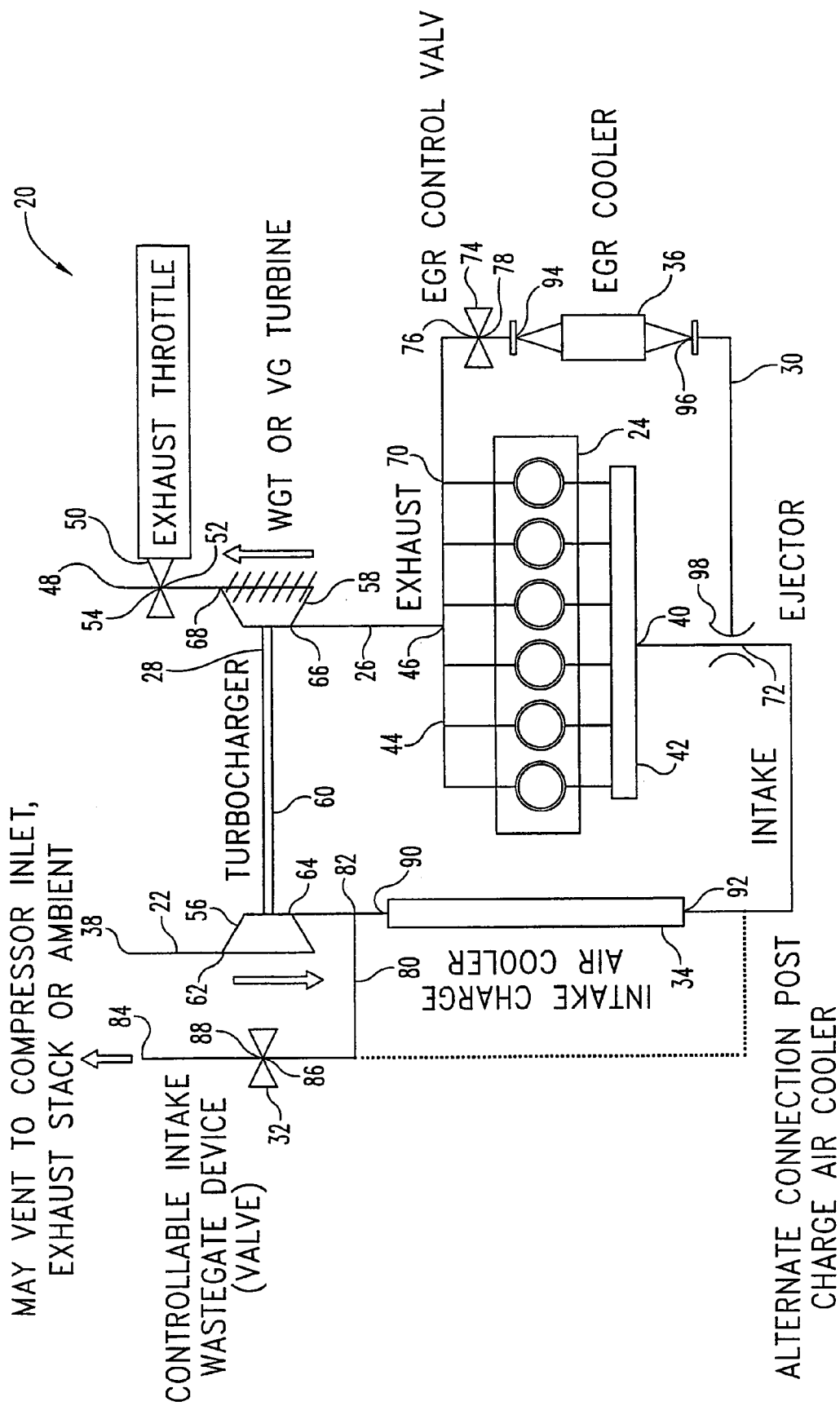
FIG. 1 illustrates a schematic drawing of one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations, modifications, and further applications of the principles of the present invention as illustrated are contemplated as would normally occur to one skilled in the art to which the invention relates.

The present invention uses a pressure-bleeding device, such as a wastegate valve, to change the pressure in an internal combustion engine in order to alter the flow rate of the exhaust gas through an exhaust gas recirculation conduit. In one form, the invention includes an inlet conduit connected to an intake manifold of an internal combustion engine and an exhaust conduit connected to exhaust manifold of an internal combustion engine. A turbocharger is connected to the intake conduit to charge the intake air before combustion. The pressure-bleeding device is operatively coupled to the intake conduit. By altering the pressure in the intake conduit, a change in pressure across the entire system is created. This change in pressure in the entire system results in a change in pressure across the exhaust gas recirculation conduit. Therefore, a flow is created through the exhaust gas recirculation conduit and can be controlled using the intake side pressure bleeding device.

Referring now to FIG. 1, an Exhaust Gas Recirculation (EGR) flow control apparatus is illustrated. The apparatus 20 includes an engine 24 to provide power, an air intake conduit 22 for providing air to the engine 24 for combustion, an exhaust conduit 26 for removing the exhaust gas produced by the engine 24 to the surrounding atmosphere, a turbocharger 28 for compressing the intake air using the exhaust gas to increase the efficiency of the engine 24, an exhaust gas recirculation conduit 30 for recirculating at least a portion of the exhaust gas produced by the engine 24 back into the air intake conduit 22, a pressure bleeding device 32 for controlling the flow rate through the exhaust gas recirculation conduit 30, an intake cooler 34 to cool the air before combustion, and an EGR cooler 36 to cool the exhaust gas before reintroduction into the air intake conduit 22.

The air intake conduit 22 may be any type of conduit readily apparent to those skilled in the art. For example, the conduit may be a pipe formed of metal or plastic. Alternatively, the conduit may be a hose or similar type construction. Any type of air intake conduit suitable for providing air to an internal combustion engine is contemplated. The air intake conduit 22 includes an inlet 38 and an outlet 40. The inlet 38 in one embodiment is directly coupled to the ambient atmosphere. In another embodiment, the inlet is proceeded by an air filter (not shown) or other devices. It is only necessary that the inlet 38 access a source of air sufficiently oxygen rich for combustion inside of the internal combustion engine 24. The air intake conduit 22 also includes an outlet 40 that is operatively coupled to the engine 24. The illustrated embodiment has the outlet 40 coupled to the intake manifold 42 of the engine 24.

The internal combustion engine 24 illustrated is a diesel engine. It is contemplated, however, that the engine could be powered by an alternate fuel. The engine 24 is illustrated being an inline six-cylinder engine. Other embodiments contemplate other piston arrangements. The engine 24 includes the intake manifold 42 and an exhaust manifold 44. The intake manifold 42 in the illustrated embodiment is operatively coupled to the outlet 40 of the air intake conduit 22. The air from the air intake conduit 22 exits the outlet 40 and enters into the intake manifold 42 of the engine 24. The intake manifold 42 allows the air that enters through the intake conduit 22 to be sent to the individual cylinders of the engine 24. Upon entering the cylinders of the engine 24 the air is combusted and exhaust gas is produced. The exhaust gas exits each cylinder through the exhaust manifold 44.

Operatively coupled to the exhaust manifold 44 is the exhaust conduit 26. The exhaust conduit 26 is generally any type of conduit suitable for allowing exhaust gas produced by the engine 24 to escape. Some embodiments have a conduit that is a cylindrical pipe shaped conduit. Other embodiments have simply air space defined in a metal chassis of the engine 24. Any conduit readily apparent to one skilled in the art is acceptable for an embodiment. The exhaust conduit 26 includes an exhaust inlet 46 that is operatively coupled to the exhaust manifold 44 of the internal combustion engine 24. The exhaust inlet 46 is adapted to enable exhaust from the exhaust manifold 44 to pass into the exhaust inlet 46 to be transported. The exhaust conduit 26 also includes an exhaust outlet 48. The illustrated exhaust outlet 48 illustrated also includes an exhaust throttle 50 having a throttle inlet 52 and a throttle outlet 54. The exhaust throttle 50 is used to create backpressure in the exhaust conduit 26 to drive exhaust gas through the EGR conduit 30. The exhaust outlet 48 vents exhaust gas to the ambient atmosphere in some embodiments or transports the exhaust gas to alternate areas, in others.

Before exhaust gas from the engine 24 passes outside of the exhaust outlet 48 and before air enters the intake manifold 42 of the engine 24, it passes through turbocharger 28. In the illustrated embodiment of FIG. 1, the turbocharger 28 has a compressor 56 and a turbine 58. The compressor 56 is used to pressurize the intake air that goes into the intake manifold 42 of the engine 24. The turbine 58 uses the exhaust gas exiting the engine 24 to help turn the compressor 56 to improve engine efficiency. The compressor 56 and the turbine 58 are connected together through a connecting shaft 60. The connecting shaft 60 allows the rotation of the turbine 58 to be synchronized with the rotation of the compressor 56. The compressor 56 includes a compressor inlet 62 and a compressor outlet 64. The compressor inlet 62 in the illustrated embodiment is operatively coupled close to the inlet 38 of the air intake conduit 22. The compressor outlet 64 occurs before the outlet 40 of the air intake conduit 22. The turbine 58 also includes a turbine inlet 66 and a turbine outlet 68. The turbine inlet 66 receives exhaust gas through exhaust conduit 26 and allows that exhaust gas to enter inside the turbine 58. Turbine outlet 68 is operatively coupled to the throttle inlet 52 of the exhaust throttle 50. It is contemplated that in other embodiments the positioning of the turbocharger 28 and the exhaust throttle 50 are varied. In addition, the illustrated embodiment includes a turbocharger 28, however, it is contemplated that apparatus 20 does not include a turbocharger in other embodiments.

The apparatus 20 also includes an exhaust gas recirculation conduit 30. The exhaust gas recirculation conduit 30 includes an inlet 70 and an outlet 72. In the illustrated embodiment the inlet 70 is operatively coupled to the exhaust manifold 44 of the engine 24. In alternate embodiments, however, it is contemplated that the EGR inlet 70 is operatively coupled to other places. For example, in one embodiment the EGR inlet 70 is operatively coupled to the exhaust conduit 26. The outlet 72 is operatively coupled to the air intake conduit 22. In other embodiments, the outlet 72 is coupled to the intake manifold 42 or even to the intake charge air cooler 34. The EGR conduit 30 also includes EGR control valve 74 having a valve inlet 76 and a valve outlet 78. The EGR control valve 74 is used to control the flow through the EGR conduit 30 when such flow is created using either the exhaust throttle 50 or the pressure bleeding device 32. The EGR conduit 30 recirculates exhaust gas produced by the engine 24 to reduce oxygen concentration in the intake manifold 42 and subsequent adverse chemical reactions in the engine 24.

In the air intake conduit 22 there is a pressure-bleeding device 32. In one embodiment, the pressure-bleeding device is a controllable intake wastegate device having a gate with an area greater than zero to about 0.14 $in^2$. Other embodiments, however, contemplate other types of pressure controlling devices such as check valves or the like. The pressure bleeding device 32 is located in venting conduit 80 having a venting conduit inlet 82 and a venting conduit outlet 84. The venting conduit outlet 84 vents to the compressor inlet, the exhaust stack, or ambient air in various embodiments. Other embodiments contemplate venting to other areas readily apparent to those skilled in the art. The pressure-bleeding device 32 also includes a device inlet 86 and a device outlet 88. The device outlet 88 vents to the outlet 84 whereas the inlet receives air from the venting conduit 80.

In addition, the air intake conduit 22 includes intake cooler 34 in the illustrated embodiment. The intake cooler 34 cools the air before it enters the intake manifold 42 of the engine 24. Cooling the air is desirable after it has been compressed because usually compression of the air by the compressor 56 results in air that is too hot to be efficiently used for combustion. Furthermore, cooling the air assists in reducing its volume, allowing more oxygen to be pumped into the intake manifold 42 of the engine 24. The intake cooler 34 includes a cooler inlet 90 and a cooler outlet 92. In the illustrated embodiment, the cooler inlet 90 is operatively coupled to the compressor outlet 64 of the compressor 56. Furthermore, the venting conduit 80 has its venting conduit inlet 82 right before the cooler inlet 90 of the intake cooler 34. Other embodiments contemplate that the venting conduit 80 is placed on the other side of the intake cooler 34 close to the cooler outlet 92. Moreover, other embodiments contemplate not having an intake cooler 34 at all.

The EGR conduit 30 also includes an EGR cooler 36. The EGR cooler 36 is also used to cool the exhaust gas that exits the engine 24 before it enters the intake manifold 42 of the engine 24. The EGR cooler 36 has an EGR cooler inlet 94 and an EGR cooler outlet 96. The inlet 94 in the illustrated embodiment is operatively coupled to the EGR control valve outlet 78. Furthermore, the EGR cooler outlet 96 is operatively coupled to an ejector 98. The ejector 98 is used to inject the recirculated engine exhaust gas back into the air intake conduit 22 for combustion. Some embodiments contemplate an EGR conduit 30 lacking an ejector 98. Some embodiments also contemplate an EGR conduit 30 lacking an EGR cooler 36.

Figure 2:
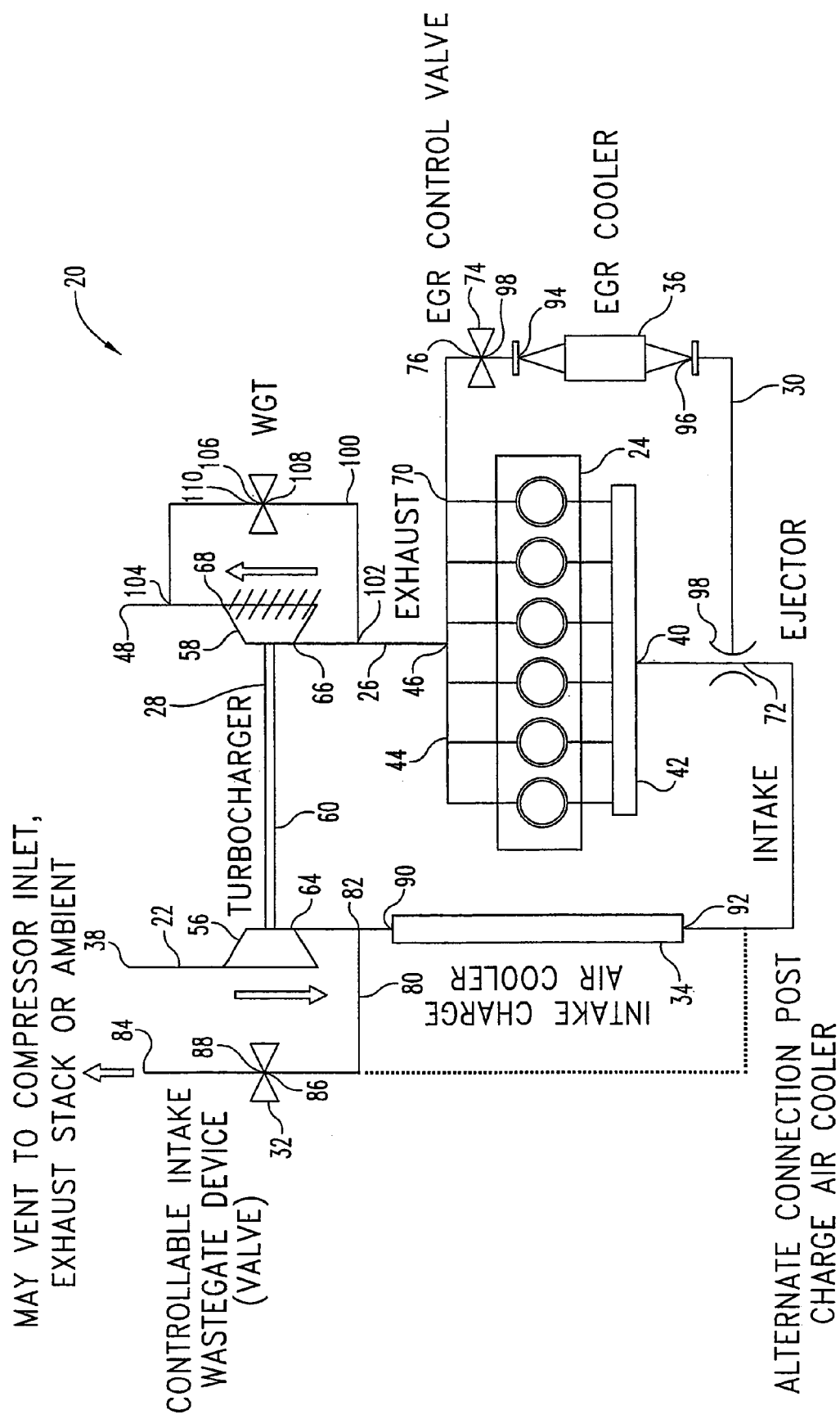
FIG. 2 illustrates a schematic drawing of an alternate embodiment.

FIG. 2 illustrates an alternate embodiment. As can be readily seen, FIG. 2 is exactly the same as embodiment illustrated in FIG. 1 except a bypass conduit 100 has been provided around the turbine 58. The bypass conduit 100 has a bypass inlet 102 and a bypass outlet 104. In addition, a second wastegate valve 106 lies within the bypass conduit 100. The wastegate valve 106 includes a second wastegate valve inlet 108 and a second wastegate valve outlet 110. This wastegate valve 106 is used to bypass the engine exhaust that exits the engine 24 around the turbine 58 of the turbocharger 28. Using this wastegated turbocharger is generally less expensive than using a VG turbine. When the exhaust gas is bypassed around the turbine 58 using the bypass conduit 100 force is not applied to the turbine 58 to help it rotate the compressor 56. Therefore, the pressure of the air entering manifold 42 is reduced. Using this second wastegate valve 106 to open or close the bypass conduit 100 helps control the pressure change across the complete system in addition to the pressure altering device 32 on the intake side.

In operation, air enters inlet 38 of air intake conduit 22 where it is compressed by compressor 56. The compressed air exits compressor 56 at outlet 64. The air flows down venting conduit 80 where it is either stopped by pressure altering device 32 or bled off from the intake conduit 22. The air that is not vented through the pressure altering device 32 passes into the intake cooler 34 where it is cooled before it enters the intake manifold 42. Air from the intake manifold 42 enters into the engine 24 where it is mixed with fuel and combusted and exhaust exits into exhaust manifold 44.

If the EGR control valve 74 is open and there is a pressure difference across the entire system at least a portion of the exhaust gas exits exhaust manifold 44 and passes through EGR conduit 30. The exhaust gas is cooled by EGR cooler 36 before it is ejected by the ejector 98 back into the air intake conduit 22. Then the recirculated air is returned to the intake manifold 42 for combustion in engine 24. The portion of the exhaust gas that is not recirculated through the EGR conduit 30 passes into the turbine inlet 66 and rotates the turbine 58 to help the compressor 56 compress. The exhaust gas then exits the turbine outlet 68. The exhaust throttle 48 determines the amount of exhaust gas that is either released or is caught to provide back pressure to help drive flow through the EGR conduit 30. Thus, the use of the intake wastegate device can be used to help create a difference in pressure between the intake and exhaust of the engine to help drive exhaust flow through the EGR conduit 30. Similarly, in FIG. 2 the same process occurs except that it is the combination of the first wastegate on the intake side and the second wastegate on the turbine side that creates this difference in pressure to drive the flow through the EGR control line.

Figure 3:
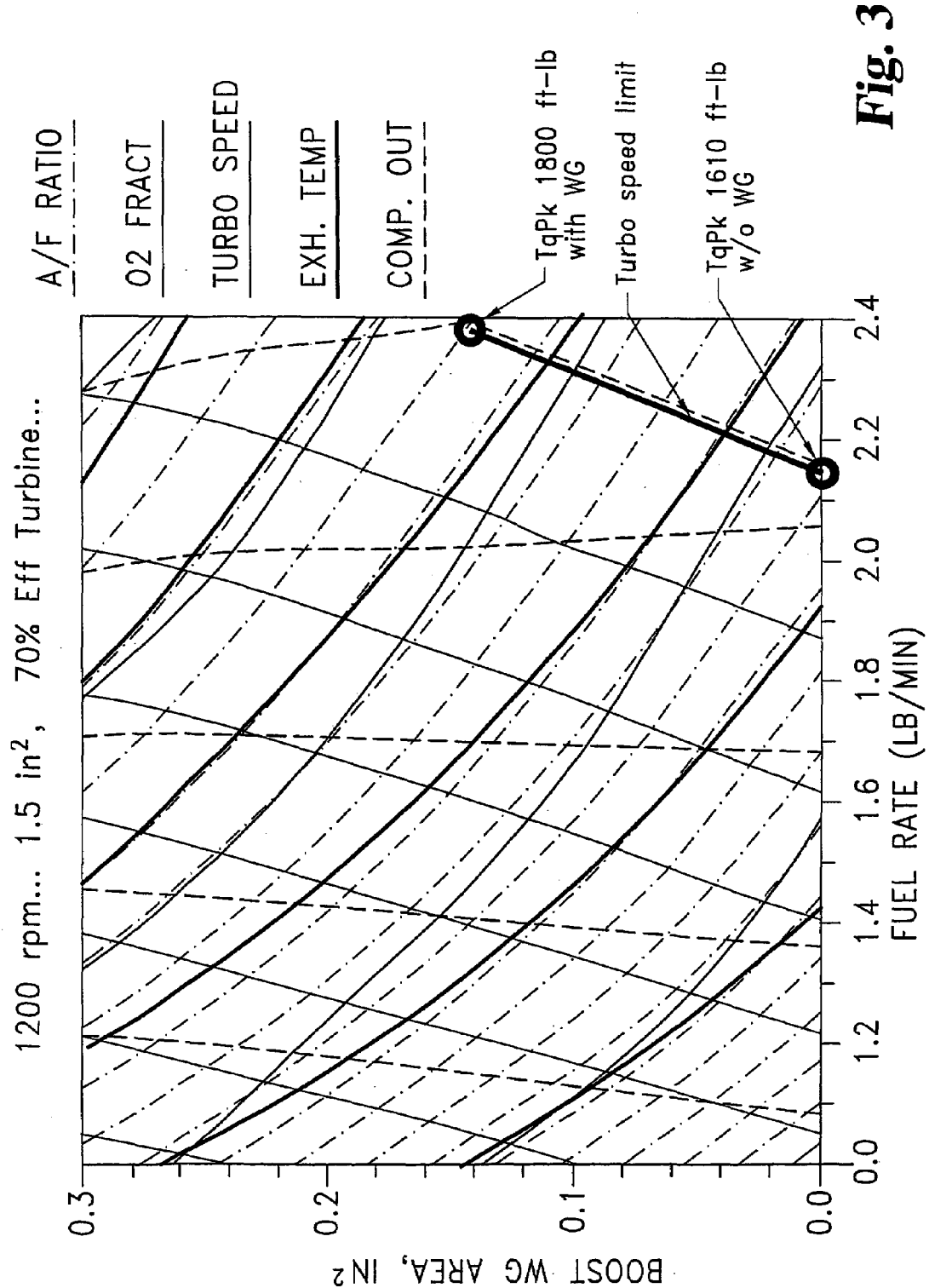
FIG. 3 illustrates a graph showing the boost wastegate nozzle area versus the fuel rate.

Referring now to FIG. 3, a graph showing the increase in the amount of torque is illustrated. The graph shows data from a turbine operating at 1200 revolutions per minute. The turbine has an orifice of 1½ square inches and an efficiency of 70%. The graph plots the area in square inches of the boost wastegate valve orifice on the vertical axis. The fuel rate in pounds per minute is plotted on the horizontal axis. As FIG. 3 makes clear, the use of a wastegate increases the amount of peak torque possible in the turbine. As FIG. 3 illustrates, close to a 200 ft-lb. increase in the amount of peak torque is achieved by using a wastegate on the intake side. This is just one benefit of many that is achieved using an intake side wastegate in addition to controlling EGR flow.

Figure 4:
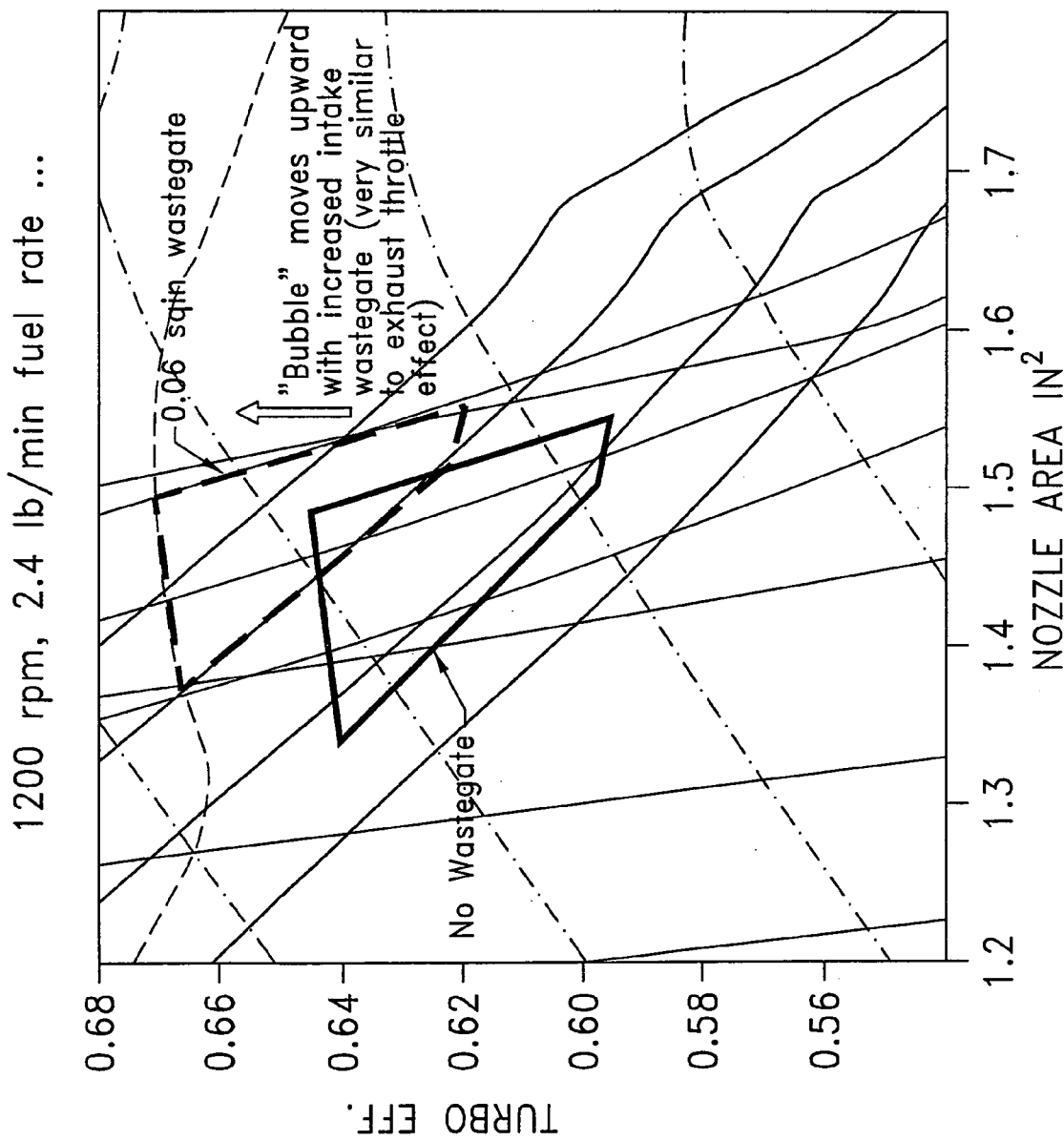
FIG. 4 illustrates a graph showing the turbine efficiency versus the nozzle area.

Referring now to FIG. 4, a graph of a turbine running at 1200 revolutions per minute on a steady fuel rate of 2.4 lb./minute is illustrated. The graph plots the turbine efficiency on the vertical axis versus the nozzle area in square inches of the turbine. As the figure illustrates, the adding of an intake wastegate helps increase the required turbine efficiency and allows a slightly larger nozzle area of the turbine to be used. This is similar to the effect produced by an exhaust throttle. However, it does not have the drawbacks associated with a hot exhaust throttle and is less expensive.

Figure 5:
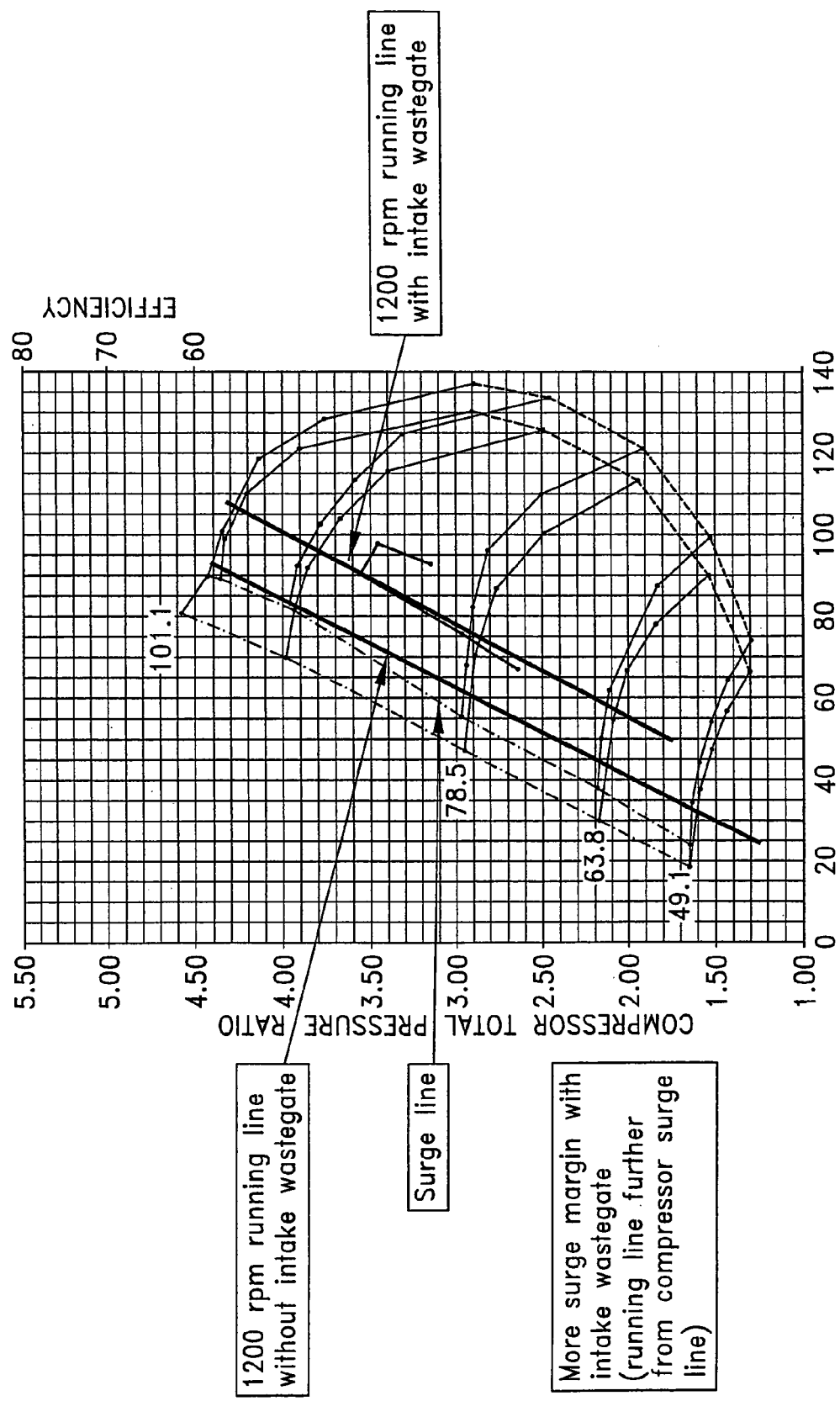
FIG. 5 illustrates a compressor map.

Referring now to FIG. 5, a compressor map is illustrated. The compressor map illustrates that the torque peak speed line moves to the right on the compressor map for an intake wastegate system, showing a larger surge margin. Yet another benefit of using an intake pressure-altering device is illustrated.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of operating an internal combustion engine with an exhaust gas recirculation system, the method comprising:

flowing air into the internal combustion engine through an air intake conduit operatively coupled to an intake manifold of the internal combustion engine;

compressing at least a portion of the air delivered to the engine with a compressor operatively coupled to the intake conduit;

flowing fuel into the internal combustion engine;

mixing at least a portion of the fuel with at least a portion of the air to create a gas/air mixture;

combusting the gas/air mixture in the engine to produce engine exhaust;

passing at least a portion of the engine exhaust through an exhaust conduit of the internal combustion engine;

recirculating a portion of the engine exhaust into the intake manifold through an exhaust gas recirculation conduit of the internal combustion engine; and selectively venting at least a portion of the air in the air intake conduit to alter a rate of said at least a portion of engine exhaust through the exhaust gas recirculation conduit and increase the surge margin of the compressor.

2. The method of claim 1 wherein said at least a portion of air is selectively vented to ambient.

3. The method of claim 1 further including the step of selectively passing said at least a portion of the engine exhaust through a turbine operatively coupled to the exhaust conduit.

4. The method of claim 3 further including the step of selectively bypassing said at least a portion of the engine exhaust from the turbine.

5. The method of claim 4 wherein selectively bypassing includes the step of operating wastegate means operatively coupled to the exhaust conduit.

6. The method of claim 1 wherein selectively venting includes the step of operating wastegate means coupled to the intake conduit at about peak torque operating conditions of the internal combustion engine.

7. An apparatus for assisting exhaust gas recirculation in a diesel engine, the apparatus comprising:

an air intake conduit having an inlet and an outlet;

an internal combustion engine including an intake manifold and an exhaust manifold, the intake manifold operatively coupled to the outlet of the air intake conduit, wherein the internal combustion engine produces exhaust gas exiting the exhaust manifold;

an exhaust conduit having an inlet and an outlet, wherein the exhaust conduit inlet is operatively coupled to the exhaust manifold;

an exhaust gas recirculation conduit having an inlet and an outlet, the inlet of the exhaust gas recirculation conduit is operatively coupled to the exhaust manifold and the outlet is operatively coupled to the intake manifold;

a turbocharger having a compressor and a turbine, the compressor being operatively coupled to the air intake conduit and the turbine being operatively coupled to the exhaust conduit; and wastegate means operatively coupled to the air intake conduit for increasing the surge margin of the compressor by selectively altering the flow rate of exhaust through the exhaust gas recirculation conduit.

8. The apparatus of claim 1 further including an intake air cooler operatively coupled to the air intake conduit.

9. The apparatus of claim 1 further including an exhaust gas recirculation air cooler operatively coupled to the exhaust gas recirculation conduit.

10. The apparatus of claim 1 further including a bypass conduit having an inlet operatively coupled to the exhaust conduit in an upstream location of the turbine and an outlet operatively coupled to the exhaust conduit in a downstream location of the turbine, wherein the bypass conduit is operable to allow at least a portion of the exhaust gas to bypass the turbine.

11. The apparatus of claim 10 further including second wastegate means operatively coupled to the bypass conduit for selectively allowing at least a portion of exhaust gas to bypass the turbine.

12. The apparatus of claim 1 wherein the turbine includes a nozzle having an area of 1.5 in$^2$ and said wastegate means includes a gate having an area greater than zero to about 0.14 in$^2$.

13. An apparatus comprising:

an air intake conduit having an inlet and an outlet;

an internal combustion engine including an intake manifold and an exhaust manifold, the intake manifold operatively coupled to the outlet of the air intake conduit, wherein the internal combustion engine produces exhaust gas exiting the exhaust manifold;

an exhaust conduit having an inlet and an outlet, wherein the exhaust conduit inlet is operatively coupled to the exhaust manifold;

a turbocharger having a compressor and a turbine, the turbocharger being operatively coupled to the air intake conduit and the exhaust conduit;

a first air cooler operatively coupled to the air intake conduit, wherein the first air cooler cools air compressed by the turbocharger;

second wastegate means operatively coupled to the exhaust conduit for selectively enabling exhaust gas to bypass the turbocharger;

an exhaust gas recirculation conduit having an inlet and an outlet, the inlet of the exhaust gas recirculation conduit being operatively coupled to the exhaust manifold and the outlet being operatively coupled to the intake manifold a second air cooler operatively coupled to the exhaust gas recirculation conduit; and first wastegate means operatively coupled to the air intake for increasing the surge margin of the compressor by selectively altering the flow rate of exhaust through the exhaust gas recirculation conduit.

14. The apparatus of claim 13 wherein the turbocharger includes a compressor and a turbine, the turbine including a nozzle having an area of 1.5 in$^2$ and said second wastegate means including a gate having an area greater than zero to about 0.14 in$^2$.

15. An internal combustion engine exhaust gas recirculation system comprising:

an internal combustion engine including an intake manifold and an exhaust manifold, the engine operable to produce exhaust gas;

an air intake conduit operatively coupled to the intake manifold for delivering air to the intake manifold;

an exhaust conduit operatively coupled to the exhaust manifold for passing at least a portion of the exhaust gas;

a turbocharger having a compressor and a turbine, the compressor being operatively coupled to the air intake conduit and the turbine being operatively coupled to the exhaust conduit;

an exhaust gas recirculation conduit operatively coupled to the intake manifold and the exhaust manifold, the exhaust gas recirculation conduit operable to flow at least a portion of the exhaust gas at a flow rate to the intake manifold; and a wastegate valve means for increasing the surge margin of the compressor, the wastegate valve means being operatively coupled to the air intake conduit for selectively venting at least a portion of the intake air to alter the flow rate of exhaust gas through the exhaust gas recirculartion conduit, the wastegate valve means including a gate having an area greater than zero to about 0.14 in$^2$.

16. The system of claim 15 wherein the turbine includes a nozzle having an area of about 1.5 in$^2$.

17. The system of claim 16 further including a bypass conduit having an inlet operatively coupled to the exhaust conduit in an upstream location of the turbine and an outlet operatively coupled to the exhaust conduit in a downstream location of the turbine, wherein the bypass conduit is operable to allow at least a portion of the exhaust gas to bypass the turbine.

18. The system of claim 17 further including a second wastegate valve positioned within the bypass conduit, the second wastegate valve operable to allow at least a portion of exhaust gas to bypass the turbine.

19. The system of claim 18 wherein the wastegate valve means operatively coupled to the air intake conduit selectively vents said at least a portion of intake air to at least one of ambient and an exhaust stack operatively coupled to the exhaust manifold.

* * * * *